…

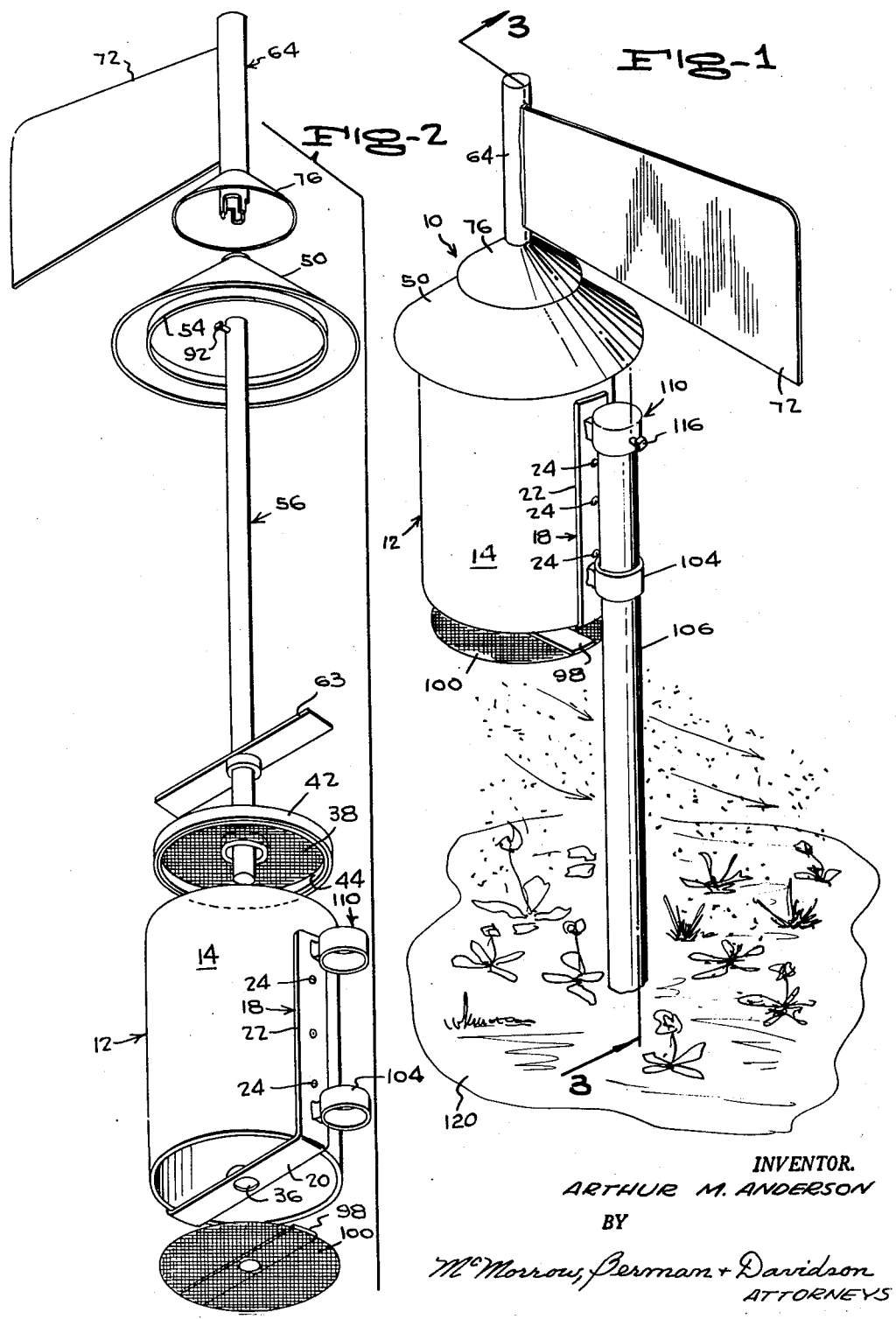

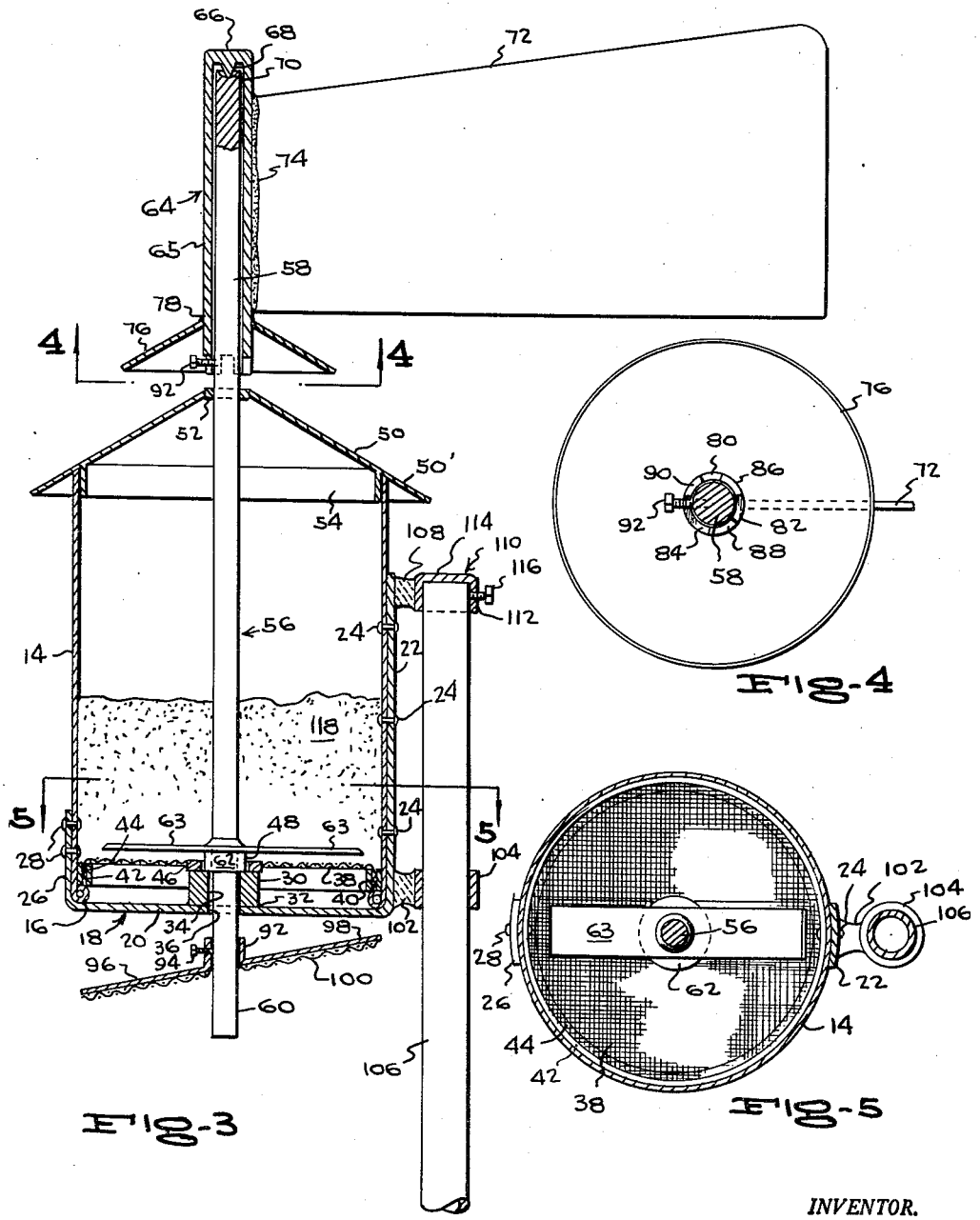

United States Patent Office 2,949,312
Patented Aug. 16, 1960

2,949,312

BROADCASTING DEVICE

Arthur M. Anderson, Squirrel, Idaho

Filed Feb. 27, 1959, Ser. No. 796,031

11 Claims. (Cl. 275—15)

This invention relates to a broadcasting device and, more specifically, the instant invention pertains, in its broadest aspects, to a dusting device for dispensing granular or powdered material.

One of the primary objects of this invention is to provide a wind-driven broadcasting device especially designed and adapted for use as a weed duster, a fish feeder, a pond fertilizer, salt feeder for livestock or wild game, moss poison for irrigation canals, mosquito exterminator on stagnant ponds, and other uses which will suggest themselves after reading the following specification and annexed drawing, wherein it is desirable to spread small amounts of the material to be dispensed in response to a change in the direction of the wind.

A further object of this invention is to provide a wind-driven broadcasting device of the type generally described supra, the device being provided with lost-motion means preventing the same from becoming operable in the absence of a change in the direction of the wind or in the presence of wind gusts blowing from a given direction.

Another object of this invention is to provide a wind-operated broadcasting device for dispensing powder or light-weight granular materials, the dispensed material being carried by or on the wind for eventual deposit on an area of ground or water to be treated thereby.

A still further object of this invention is to provide a broadcasting device which is so constructed that the undispensed material disposed therein is protected from adverse weather such as, for example, rain, snow or dirt.

Still another object of this invention is to provide a broadcasting device for powdered or granular material, the device being readily adaptable for installation at any desirable site and which is operable in the absence of human attendance.

This invention contemplates, as a still further object thereof, the provision of a broadcasting device of the type generally described above, the device being noncomplex in construction and assembly, inexpensive to manufacture and maintain, and durable in use.

Other and further objects and advantages of the instant invention will become more manifest from a consideration of the following specification when read in conjunction with the annexed drawings, in which:

Figure 1 is a perspective view of a broadcasting device constructed in accordance with the teachings of this invention;

Figure 2 is an enlarged exploded perspective view of the broadcasting device illustrated in Figure 1;

Figure 3 is an enlarged detail cross sectional view, partly in elevation, Figure 3 being taken substantially on the vertical plane of line 3—3 of Figure 1, looking in the direction of the arrows;

Figure 4 is an enlarged detail cross sectional view taken substantially upon the horizontal plane of line 4—4 of Figure 3, looking in the direction of the arrows; and Figure 5 is a detail cross sectional view taken substantially on the horizontal plane of line 5—5 of Figure 3, looking in the direction of the arrows.

Referring now more specifically to the drawings, reference numeral 10 designates, in general, a broadcasting device constructed in accordance with the instant invention. As is seen in the drawings, the broadcasting device 10 includes a vertically elongated substantially hollow cylindrical receptacle 12 which includes a side wall 14 having opposed open ends. To serve the purpose to be described below, the lower end of the side wall 14 is provided with an inwardly extending circumferential bead or roll 16.

A connector bracket 18 having an L-shape configuration is provided with a foot portion 20 which extends diametrically across the open end of the side wall 14 while the leg portion 22 thereof is riveted at 24 or otherwise secured thereto. The outer end of the foot portion 20 terminates in an upright tongue 26 which is also riveted or otherwise secured to the side wall 14 as at 28. The leg portion 22 and tongue 26 are preferably disposed diametrically with respect to the side wall 14 and extend axially thereof.

The foot portion 20 has an enlarged cylindrical boss 30 secured thereto as by welding 32, the boss 30 having a central bore 34 coaxially aligned with a transversely extending opening 36. The axes of the bore and opening 36 are also coaxial with respect to the longitudinal axis of the cylindrical side wall 14.

Removably disposed within the receptacle 12 is a circular disc 38 formed of wire or mesh and having a depending continuous circumferential flange 40. The flange 40 is clamped between a pair of reinforcing circular bands 42, 44, and the central portion of the disc 38 receives an annular bushing 46 therethrough. As is clearly seen in the drawings, and particularly in Figure 3, the band 42 telescopes within the side wall 14 to permit it and the band 44 to rest on and be supported by the roll or bead 16 with the lower end of the bushing 46 engaging against and supported on the upper end of the boss 30. The bushing 46, for reasons to be made clear below, is provided with a central circular passage 48 coaxially aligned with the bore 34.

The other or top end of the receptacle 12 is provided with a closure member 50 having a frusto-conical configuration, the closure member 50 having a shaft journal or annular bearing 52 inserted therein and rigidly secured thereto in the plane of the frustum. Adjacent its base, the closure member 50 is formed with a depending circular flange 54 adapted to telescope within the open upper end of the side wall 14 to prevent lateral displacement of the closure member 50 as well as to effect an essentially water-tight and air-tight seal therebetween. As is seen in the several figures, the closure member 50 is formed with a marginal edge portion 50' which depends below the upper end of the side wall 14 to prevent the entry of water and wind therein.

Reference numeral 56 denotes an elongated cylindrical shaft which extends through the cylindrical side wall coaxially therewith, and also extends through the closure member 50 and is coaxial with respect thereto, the shaft 56 has opposed ends 58, 60, which project beyond the opposed ends of the receptacle 12. The shaft 56 is journaled for rotation through the bearing 52, bushing 46, the boss 30 and the foot portion 20 in the manner illustrated and has fixedly secured thereto intermediate its ends an abutment member 62 which projects through the passage 48 of the bushing 46 to engage against the upper end of the boss 30 and thus limit the downward movement of the shaft 56 relative to the side wall 14. To the abutment member 62 is secured a pair of diametrically opposed agitator blades 63 disposed approximate to but vertically spaced above the disc 38.

On the upper end of the shaft 56 is telescopically mounted a substantially hollow cylindrical cap shaft 64 having a side wall 65 and an end wall 66. The inner side of the end wall 66 has projecting therefrom a pointed pivot pin 68 adapted to bear against a concavity 70 formed in the outer end of the upper end 58 of the shaft 56.

A wind vane 72 has one of its edges welded at 74 to the side wall 65 and extends axially thereof. Immediately below the vane 72 the side wall 65 extends through the frustum plane of a frusto-conical shield 76 which is secured thereto, as by welding 78. The base of the shield 76 has a diameter greater than the diameter of the bearing 52 to prevent rain, snow and other foreign materials from entering therein.

The lower open end of the side wall 65 is formed with inwardly extending recesses 80, 82 and 84, respectively, having a length of forty-five degrees, sixty degrees and ninety degrees. The formation of the recesses gives rise to arcuate stop lugs 86, 88 and 90. As is clearly seen in the drawings, the upper end 58 of the shaft 56 is provided with a laterally projecting set screw 92 which is adapted to be selectively received within any one of the recesses 80, 82 or 84, the shoulders 86, 88 and 90 forming stop means for limiting the clockwise or counterclockwise direction of rotation of the cap shaft 64 relative to the shaft 56. Thus, it is only when the set screw 90 is in engagement with one of the aforementioned shoulders that movement of the shaft 56 takes place simultaneously with and in the same direction as the rotation of the cap shaft 64.

To the other or lower end 60 of the shaft 56 is secured a collar 92 by means of a set screw 94, the lower end of the collar 92 having integrally formed therewith a pair of diametrically opposed arms 96, 98. As is seen in Figure 3, the arms 96, 98 are inclined at an angle and have rigidly secured to the underside thereof a distributor screen 100. The screen 100 is preferably circular in configuration.

To the lower end of the foot portion 22 of the bracket 18 is rigidly secured a laterally projecting brace 102 which terminates at its outer end in a substantially hollow cylindrical boss 104 adapted to be telescoped over a substantially hollow cylindrical and elongated standard 106.

A similar brace 108 projects laterally from the upper end of the leg portion 22 of the brace 18 and terminates at its outer end in an inverted substantially hollow cylindrical cap 110 having a side wall 112 telescoped over the upper end of the standard 106 and an end wall 114 abutting thereagainst. The broadcasting device is secured against rotation about the longitudinal axis of the standard 106 by means of a set screw 116 which is threaded through the side wall 112 for engagement with the standard 106.

Having described the component elements of this invention in detail and the assembly thereof relative to one another, the operation of the broadcaster is deemed to be evident. However, and by way of explanation, let it be assumed that the receptacle 12 is at least partially filled with powdered or granular material designated, in general, by reference numeral 118. The material 118 is normally supported on the wire mesh disc 38, and the size of the openings of the wire mesh disc is not quite great enough to permit the material 118 to pass freely therethrough.

Let it further be assumed that the set screw 92 is disposed within the recess 94 whereby the cap shaft 64 is free to rotate on the shaft 56 between the limits defined by the shoulders 88 and 90.

With the shaft 56, the cap shaft 64 and the set screw 92 arranged and disposed in the manner shown in Figure 4, it is clear that wind which may blow against the vane 72 to turn the same and the attached cap shaft 64 in a clockwise direction will permit relative movement of the cap shaft 64 relative to the shaft 56 until the set screw 92 is engaged by the shoulder 88. Relative movement between the cap shaft 64 and the shaft 56 in the opposite direction can only take place when the direction of the wind is reversed, and this movement is limited by the engagement of set screw 92 with the shoulder 90.

The force of the wind when sufficient to cause engagement of the set screw 92 with any one of the shoulders adjacent the slot in which the same is received causes rotation of the shaft 56 and consequently of the agitator blades 63. The disturbance set up by the blade 63 is sufficient to cause some of the powdered material 118 to pass through the disc 38 and to impinge against the distributor screen 100. The wind blowing beneath the distributor screen 100 will lift the dispensed material 118 therefrom for distribution throughout a given area.

The standard 106 is, of course, adapted for engagement with the earth designated at 120 or the same may be driven into material at any given or chosen distribution site. After all of the material 118 has been dispensed from the receptacle 12 the refilling thereof is a relatively simple matter. The operator need but lift upwardly on the cap shaft 64 to effect disconnection thereof from the shaft 56, after which the closure member 50 may be slidably disconnected from the shaft 56 by moving same upwardly on the upper end 58 to completely disengage the cap from the shaft or to move the same a sufficiesnt distance to permit the operator to refill the receptacle 12 from its now open upper end.

After the new material 118 has been placed in the receptacle 12, the closure member 50 is slid downwardly on the shaft 56 until the same engages in the open upper end of the side wall 14, and thereafter, the cap shaft 64 is again telescoped over the upper end 58 of the shaft 56, the operator selecting the desired one of the recesses 80, 82, 84 which is to receive the set screw 92.

Having described and illustrated one embodiment of this invention in detail, it is to be understood that the same is offered merely by way of example, and that the instant invention is to be limited only by the scope of the appended claims.

What is claimed is:

1. A broadcasting device comprising an elongated substantially hollow cylindrical receptacle having an elongated substantially cylindrical side wall provided with a pair of opposed open ends, a bracket extending across one of said open ends and having portions thereof fixedly secured to said side wall, said bracket having an aperture transversely therethrough coaxially aligned with the longitudinal axis of said receptacle, a substantially cylindrical boss mounted on said bracket and having a bore extending therethrough coaxially aligned with said aperture, a first screen disc disposed within said receptacle and having a centrally disposed annular bushing fixedly secured thereto, said first screen disc having a laterally extending circumferential flange clampingly engaged between a pair of circular bands, said side wall having internal bead adjacent its said one end, said screen being disposed within said side wall with said bands engaging against and being supported on said bead with said bushing engaged against said boss, a closure member for the other of said open ends of said side wall, an elongated shaft extending through said side wall and coaxially aligned therewith, said shaft having one end thereof projecting through said annular bushing, said boss and said aperture for rotation therein and extending beyond said one open end, a closure member for the other of said open ends, the other end of said shaft projecting through and being journaled for rotation in said closure member, a cap shaft telescoped over said other end of said shaft, a wind vane connected to said cap shaft, and lost-motion means connecting said cap shaft with said shaft.

2. A broadcasting device as defined in claim 1 wherein said closure member has a frusto-conical configuration and said other end of said shaft projects through said closure member substantially at the frustum plane thereof, and a substantially frusto-conical shield secured to said cap shaft, said shield having a diameter greater than the diameter of the frustum of said closure member.

3. A broadcasting device as defined in claim 2, and a distributor screen adjustably secured on said one end of said shaft and being inclined at an acute angle relative thereto.

4. A broadcasting device as defined in claim 3, and ground-engaging means for supporting said receptacle.

5. A broadcasting device as defined in claim 4, and means fixedly securing said receptacle to said ground-engaging means to prevent relative rotation therebetween.

6. A broadcasting device as defined in claim 5, and agitating means fixedly secured to said shaft, said agitating means being disposed within said receptacle adjacent to but spaced from said first screen.

7. A broadcasting device comprising an elongated substantially hollow cylindrical receptacle having an elongated substantially cylindrical side wall provided with a pair of opposed open ends, a bracket extending across one of said open ends and having portions thereof fixedly secured to said side wall, said bracket having an aperture extending transversely therethrough coaxially aligned with the longitudinal axis of said receptacle, a substantially cylindrical boss mounted on said bracket and having a bore extending therethrough coaxially aligned with said aperture, a screen disc disposed within said receptacle and having a centrally disposed annular bushing fixedly secured thereto, said screen disc having a laterally extending circumferential flange clampingly engaged between a pair of circular bands, said side wall having an internal bead adjacent its said one end, said screen being disposed within said side wall with said bands engaging against and being supported on said bead with said bushing engaging against said boss, a closure member for the other of said open ends of said side wall, an elongated shaft extending through said side wall and coaxially aligned therewith, said shaft having one end thereof projecting through said annular bushing, said boss and said aperture for rotation therein and extended beyond said one open end, a closure member for the other of said open ends, the other end of said shaft projecting through and being journaled for rotation in said closure member, a cap shaft telescoped over said other end of said shaft, means connecting said cap shaft for rotation with said shaft, a wind vane secured to said cap shaft and projecting radially therefrom, agitator means fixedly secured to said shaft adjacent to but spaced from said screen, and a wire distributor screen fixedly secured to said one end of said shaft at an acute angle with respect thereto exteriorly of the said side wall.

8. A broadcasting device as defined in claim 7, wherein said closure means includes means for preventing inadvertent and accidental lateral displacement of said closure means relative to said side wall.

9. A broadcasting device as defined in claim 8, wherein said closure means comprises a frusto-conical element and said means for preventing said displacement comprises a circular flange depending from said element for telescopic engagement within said side wall adjacent said other of said open ends thereof.

10. A broadcasting device comprising an elongated substantially hollow cylindrical receptacle having an elongated substantially cylindrical side wall provided with a pair of opposed open ends, a bracket extending across one of said open ends and having portions thereof fixedly secured to said side wall, said bracket having an aperture transversely therethrough coaxially aligned with the longitudinal axis of said receptacle, a substantially cylindrical boss mounted on said bracket and having a bore extending therethrough coaxially aligned with said aperture, a first screen disc disposed within said receptacle and having a centrally disposed annular bushing fixedly secured thereto, said first screen disc extending across said receptacle adjacent said one open end thereof, said side wall having an internal bead adjacent its said one end, said first screen disc being disposed within said side wall and being supported on said bead with said bushing engaged against said boss, a closure member for the other of said open ends of said side wall, an elongated shaft extending through said side wall and coaxially aligned therewith, said shaft having one end thereof projecting through said annular bushing, said boss and said aperture for rotation therein and extending beyond said one open end, a closure member for the other of said open ends, the other end of said shaft projecting through and being journalled for rotation in said closure member, and a wind vane connected to said cap shaft.

11. A broadcasting device comprising an elongated substantially hollow cylindrical receptacle having an elongated substantially cylindrical side wall provided with a pair of opposed open ends, a bracket extending across one of said open ends and having portions thereof fixedly secured to said side wall, said bracket having an aperture extending transversely therethrough coaxially aligned with the longitudinal axis of said receptacle, a substantially cylindrical boss mounted on said bracket and having a bore extending therethrough coaxially aligned with said aperture, a screen disc disposed within said receptacle and having a centrally disposed annular bushing fixedly secured thereto, said screen disc having a laterally extending circumferential flange clampingly engaged between a pair of circular bands, said side wall having an internal bead adjacent its said one end, said screen being disposed within said side wall with said bands engaging against and being supported on said bead for said bushing engaging against said boss, a closure member for the other of said open ends of said side wall, an elongated shaft extending through said side wall and coaxially aligned therewith, said shaft having one end thereof projecting through said annular bushing, said boss and said aperture for rotation therein and being extended beyond said one open end, a closure member for the other of said open ends, the other end of said shaft projecting through and being journalled for rotation in said closure member, a wind vane secured to said shaft and projecting radially therefrom, agitator means fixedly secured to said shaft adjacent to but spaced from said screen, and a wire distributor screen fixedly secured to said one end of said shaft at an acute angle with respect thereto exteriorly of said side wall.

References Cited in the file of this patent

UNITED STATES PATENTS

| | | |
|---|---|---|
| 133,911 | Wilson | Dec. 10, 1872 |
| 318,453 | Colman | May 26, 1885 |
| 2,162,348 | Hacmac | June 13, 1939 |